Feb. 24, 1970 — A. STIERINGER — 3,497,295
MOTION PICTURE CAMERA
Filed Aug. 2, 1967 — 2 Sheets-Sheet 1

INVENTOR
ALBERT STIERINGER

BY
Michael S. Striker
his ATTORNEY

Feb. 24, 1970 A. STIERINGER 3,497,295
MOTION PICTURE CAMERA
Filed Aug. 2, 1967 2 Sheets-Sheet 2

INVENTOR
ALBERT STIERINGER

BY
Michael S. Striker
his ATTORNEY

United States Patent Office 3,497,295
Patented Feb. 24, 1970

---

3,497,295
MOTION PICTURE CAMERA
Albert Stieringer, Calmbach, Germany, assignor to Robert Bosch Elektronik und Photokino GmbH, Stuttgart-Unterturkheim, Germany
Filed Aug. 2, 1967, Ser. No. 657,846
Claims priority, application Germany, Sept. 21, 1966,
B 89,008
Int. Cl. G03b 7/08, 19/18
U.S. Cl. 352—141                              9 Claims

ABSTRACT OF THE DISCLOSURE

A movie camera wherein the shutter reflects light onto a photosensitive element which effects automatic adjustment of the diaphragm as a function of the intensity of scene brightness. The camera comprises an overriding unit which can control the diaphragm during acceleration of the shutter from zero speed to normal operating speed so that the size of the diaphragm aperture is not affected by the fact that the shutter's speed changes. The overriding unit comprises a mask which is gradually moved out of the path of light between the shutter and the photosensitive element when the shutter is being accelerated, or a variable resistor which is series-connected with the photosensitive element and whose resistance decreases as a function of increase in the shutter speed. The mask or the variable resistor is movable by a centrifugal governor which receives motion from the drive for the shutter.

BACKGROUND OF THE INVENTION

The present invention relates to movie cameras in general, and more particularly to improvements in movie cameras with diaphragms which are adjusted automatically in response to changes in the strength of a current flowing through a photosensitive element receiving light which passes through the objective and is reflected by the shutter.

It is already known to provide a movie camera with a shutter which can reflect light, after such light has passed through the objective, against a photosensitive element when the shutter does not permit the light to reach the film. Such movie cameras are normally equipped with a device which reduces the amount of light reaching the photosensitive element when the shutter is in the position of rest and prevents the light from reaching the movie film. This is necessary in order to make sure that the amount of light reaching the photosensitive element when the shutter is idle is substantially the same as the average amount of light reaching the photosensitive element when the shutter performs cyclical movements at normal speed. For example, U.S. Patent No. 3,248,166 to Reinsch discloses an auxiliary diaphragm which resembles a mask and reduces the amount of light that can reach the photosensitive element when the shutter is idle. The mask is moved out of the light path in response to actuation of the shutter release. Such an arrangement cannot take into account changes in shutter speed when the shutter is being accelerated from zero speed to normal operating speed.

German Patent No. 1,067,303 discloses a fixed resistor which is connected in the circuit with the photosensitive element when the shutter is idle and is disconnected from the photosensitive element in automatic response to manipulation of the shutter release. Such movie cameras exhibit the same drawbacks as the Reinsch camera, i.e., there is no compensation for the fact that the speed of the shutter changes immediately after starting and before the shutter begins to perform cyclical movements at normal operating speed. In order to insure that the size of the diaphragm aperture will be an accurate function of the intensity of scene brightness, it is necessary that the photosensitive element should receive an unchanging amount of light (at unchanging scene brightness) irrespective of whether the shutter is in the position of rest, whether the shutter cycles at normal operating speed, or whether the shutter is being accelerated from zero speed to normal speed. This insures that the needle of the moving coil instrument which is connected with the photosensitive element will remain stationary when the shutter is being accelerated, i.e., the fact that the speed of the shutter changes will not affect the size of the diaphragm aperture. Presently known movie cameras cannot fulfill the above requirement because they compensate only for the fact that the shutter is idle but not for the fact that a certain interval of time elapses before the shutter is acceleraed from zero speed to normal speed. In other words, the aforementioned mask will allow for an immediate increase in the amount of light that reaches the photosensitive element as soon as the drive for the shutter receives a starting impulse, and the aforementioned resistor will be disconnected from the photosensitive element well ahead of the exact moment when the shutter begins to move at normal speed. This means that the needle of the moving coil instrument changes its position during acceleration of the shutter irrespective of whether the intensity of scene light changes or remains the same.

SUMMARY OF THE INVENTION

It is an important object of my present invention to provide a movie camera which overcomes the aforementioned drawbacks of presently known movie cameras and wherein the acceleration of the shutter from zero speed to normal operating speed cannot unduly or adversely affect the setting of the diaphragm.

Another object of the invention is to provide a novel overriding unit which can be used in the movie camera of the just outlined character to compensate for the fact that the frequency at which the shutter reflects light onto a photosensitive element during acceleration from zero speed is less than the frequeny at normal operating speed of the shutter.

A further object of my invention is to provide a movie camera wherein the just mentioned overriding unit occupies little room and wherein such overriding unit receives motion directly from the drive for the shutter.

The movie camera of my invention comprises basically an adjustable diaphragm which provides a range of aperture sizes, an objective, a shutter arranged to move cyclically between the objective and the film in order to cover and uncover the film during each cycle, the shutter having a position of rest in which the film is covered, drive means operative to accelerate the shutter from the position of rest to a normal speed and to thereupon drive the shutter at such normal speed, photosensitive means, light-reflecting means associated with (and preferably provided on) the shutter to direct against the photosensitive means light passing through the objective when the shutter covers the film, motion transmitting means including a moving coil instrument connected in circuit with the photosensitive means for adjusting the diaphragm as a function of the intensity and amount of light reaching the photosensitive means, and overriding means for controlling the adjustment of the diaphragm as a function of the speed of the shutter during acceleration to normal speed to compensate for changes in the amount of light reaching the photosensitive means at unchanging scene brightness during acceleration of the shutter.

The overriding means may comprise a mask which is movable into and from the path of light between the light-reflecting means and the photosensitive means in response to motion received from a centrifugal governor which is driven by the drive for the shutter. Alternatively, the overriding means may comprise a variable resistor which is series-connected with the photosensitive means and whose resistance decreases gradually in response to increasing rotational speed of the shutter. The slider of the variable resistor may be constituted by a lever which receives motion from a centrifugal governor on the shutter shaft.

The novel features which are considered as characteristic of the invention are set forth in particular in the appended claims. The improved movie camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
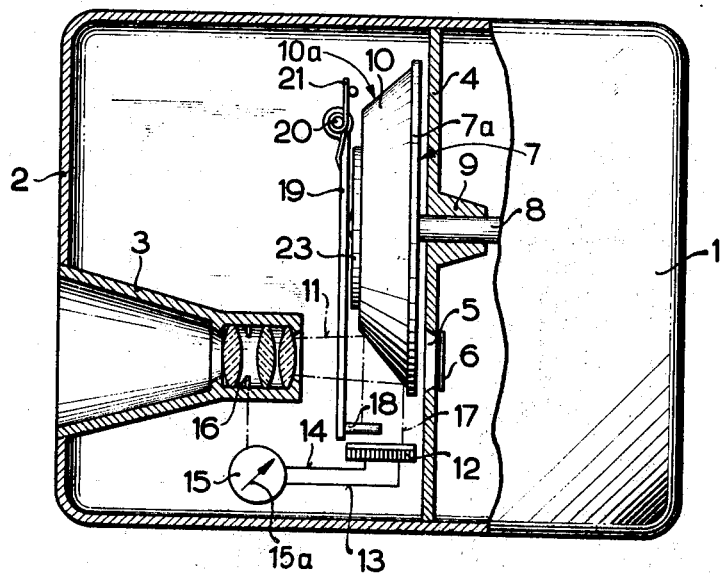
FIG. 1 is a partly elevational and partly longitudinal vertical sectional view of a movie camera which embodies one form of my invention.

Referring first to FIG. 1, there is shown a portion of a movie camera which comprises a housing or body 1 including a front wall 2 which carries an objective 3. An internal wall or partition 4 of the housing 1 is provided with a window or gate 5 located in front of the movie film 6 which is advanced stepwise by a suitable pulldown (not shown), always by the length of a frame. The space between the objective 3 and window 5 accommodates a rotary shutter 7 whose drive includes a shaft 8 (see also FIGS. 2 and 3). The shaft 8 is rotatable in a sleeve 9 of the partition 4 and receives torque from an electric motor, not shown. The shutter 7 comprises a hub 7a which is affixed to the shaft 8 and a blade 10 which extends along an arc of about 180 degrees. When the shaft 8 drives the shutter, the blade 10 cycles behind the objective 3 to cover and uncover the film 6 during each cycle. When the shutter 7 is in a position of rest, the blade 10 covers the window 5 to prevent admission of light to the film 6. The film is transported during that stage of each cycle when the blade 10 covers the window 5.

The blade 10 resembles a portion of a conical frustum and its conical external surface is mirrored, as at 10a, to direct light coming from the objective 3 against a photosensitive element 12 which forms part of the adjusting means for a diaphragm 16. FIG. 1 shows that the light beam 11 which has passed through the objective 3 is deflected by the light-reflecting surface 10a against the light-sensitive surface of the element 12 when the blade 10 prevents passage of light through the window 5. The photosensitive element 12 is connected in circuit with a moving coil instrument 15 by means of conductors 13, 14, and the instrument 15 forms part of a motion transmitting device which adjusts the diaphragm 16 as a function of the intensity of light reaching the photosensitive element 12. The manner in which the position of the output member or needle of a moving coil instrument can be scanned by a tracking or sensing unit which adjusts the diaphragm is well known from the art of cameras.

Figure 2:
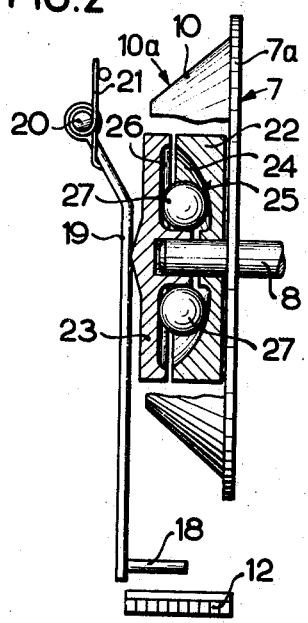
FIGURE 2 illustrates on a larger scale a detail of the structure shown in FIG. 1, the overriding means of the camera being shown in one end position corresponding to the rest position of the shutter.
Figure 3:
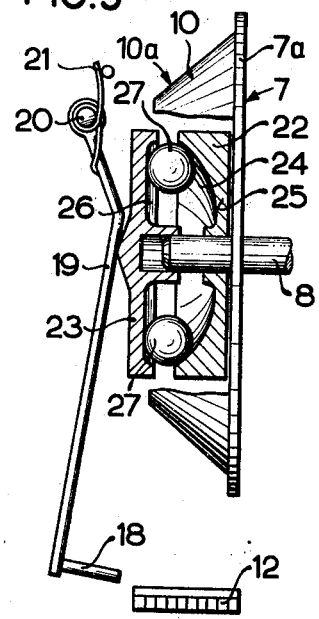
FIG. 3 illustrates the overriding means in a second end position which corresponds to rotation of the shutter at normal speed.

The movie camera further comprises a novel overriding unit which can influence the size of the aperture furnished by the diaphragm 16 in addition to the influence exercised by the intensity of light which reaches the photosensitive element 12. In the embodiment of FIGS. 1–3, the overriding unit comprises a centrifugal governor which receives motion from the drive for the shutter 7, a spring-biased member in the form of a lever 19, and an opaque portion or mask 18 provided at the free end of the lever 19 and extendable into and from the path of light 17 deflected by the surface 10a. The lever 19 is turnable on a pivot pin 20 which is affixed to the housing 1 and is biased by a torsion spring 21 which is coiled around the pivot pin 20 and tends to turn the lever 19 in a counterclockwise direction, as viewed in FIGS. 1–3.

When the camera is idle, i.e., when the shutter 7 is in the position of rest and the blade 10 prevents the passage of light 11 from the objective 3 to the film 6, the spring 21 is free to maintain the lever 19 in the position shown in FIG. 1 or 2. The mask 18 then overlies substantially half of the light-sensitive surface on the element 12 so that this element receives a relatively small part of the light beam 17 reflected by the surface 10a. The photosensitive element 12 controls the position of the output member 15a in the moving coil instrument 15, i.e., the angular position of the output member 15a is a function of the strength of photocurrent generated by the element 12.

When the motor which drives the shaft 8 for the shutter 7 is started by depression of a suitable starter member (not shown), it takes a certain amount of time before the shutter is accelerated from the position of rest to its normal operating speed. Once the shutter rotates or cycles at such normal speed, the aforementioned centrifugal governor automatically shifts the mask 18 of the lever 19 to the inoperative position of FIG. 3 in which the entire top face of the photosensitive element 12 is exposed to light deflected by the surface 10a of the blade 10. Thus, when the shutter 7 rotates at normal speed, the surface 10a will direct the entire light beam 17 against the photosensitive element 12 during each second half revolution of the shutter. The position of the output member 15a remains unchanged as long as the intensity of scene brightness remains constant.

The aforementioned centrifugal governor of the overriding unit is best shown in FIGS. 2 and 3. It comprises a first cupped portion 22 which is rigid with the shaft 8, a second cupped portion 23 which is movable axially of the shaft 8 and is biased by the torsion spring 21 through the intermediary of the lever 19 so that it tends to move axially toward the cupped portion 22, and a plurality of spherical weights 27 which are disposed between the portions 22, 23 and tend to move radially outwardly and away from the shaft 8 when the latter's rotational speed increases. That side of the cupped portion 22 which faces the portion 23 is provided with a circular depression 24 bounded by a concave surface 25 which is tracked by the weights 27. The right-hand side of the portion 23 has a relatively shallow depression 26 whose bottom surface is engaged by the weights 27. As the rotational speed of the shaft 8 increases, the weights 27 are caused to roll along the concave surface 25 and cause the portion 23 to move axially and away from the portion 22 to pivot the lever 19 against the opposition of the spring 21. The lever 19 then moves the mask 18 from the position of FIG. 2 to that shown in FIG. 3 with the result that more light can reach the photosensitive element 12. When the speed of the shaft 8 decreases, the spring 21 cooperates with the concave surface 25 to move the weights 27 radially inwardly and back to the positions shown in FIG. 2.

The mass of the weights 27 and the bias of the spring 21 are selected in such a way that the time required by weights 27 to move from the positions shown in FIG. 2 to those shown in FIG. 3 is the same as the time required to accelerate the shutter 7 from zero speed to normal operating speed. In other words, the mask 18 will be fully effective when the shutter 7 is in the position of rest and the mask 18 will be totally ineffective when the shutter 7 rotates at normal speed. A very important advantage of the governor shown in FIGS. 2 and 3 is that it effects gradual movement of the mask 18 from operative to inoperative position so that the effective surface of the photosensitive element 12 increases as a function of increase in rotational speed of the shutter 7, i.e., as a function of the reduction in exposure time which is shorter when the shutter rotates at a higher speed. The element 12 receives during starting and acceleration of the shutter 7 exactly the same amount of light as when the shutter is at rest or operates at normal speed. Therefore, the output member 15a of the moving coil instrument 15 will remain at a standstill during the critical interval of acceleration of the shutter 7 from zero speed to normal operating speed.

Figure 4:
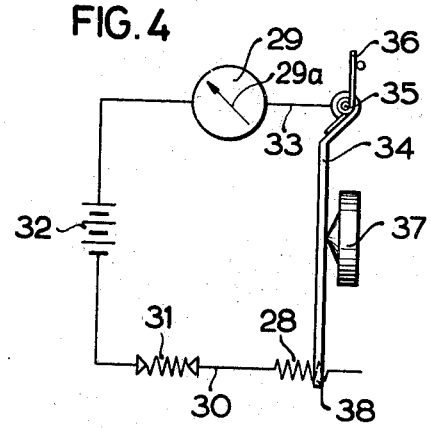
FIG. 4 is a fragmentary diagrammatic view of a second movie camera wherein the overriding means comprises a variable resistor which is shown in one of its end positions corresponding to the rest position of the shutter.
Figure 5:
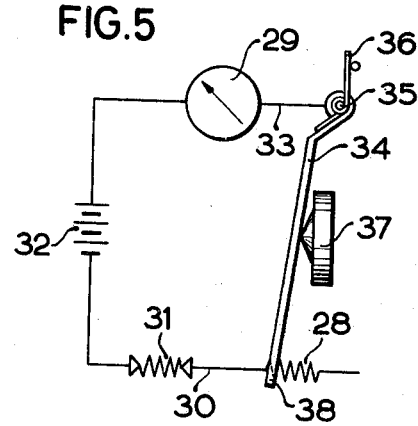
FIG. 5 illustrates the structure of FIG. 4 but with the resistor in other end position which the resistor assumes when the shutter is caused to perform cyclical movements at normal speed.

FIGS. 4 and 5 illustrate schematically a portion of a modified movie camera. The manner in which a light-reflecting surface of the shutter (not shown) can direct light against a photosensitive element 31 in the circuit of the moving coil instrument 29 is the same as described in connection with FIGS. 1 to 3. The mask 18 of FIGS. 1 to 3 is replaced by a variable resistor which includes a stationary portion 28 and a movable portion or slider 38 constituted by the free end of a spring-biased lever 34 corresponding substantially to the lever 19. The variable resistor 28, 38 is connected in series with the photosensitive element 31 by a conductor 30. The lever 34 consists of conductive material and forms part of the electric circuit which includes the instrument 29, element 31 and variable resistor 28, 38. The lever 34 is turnable on a pivot pin 35 and is biased by a torsion spring 36 which urges it against the conical tip of a disk-shaped portion 37 of a centrifugal governor corresponding to the portion 23 shown in FIGS. 2 and 3. The element 31 is constituted by a photosensitive resistor, not by a cell; therefore, the circuit further includes a battery 32 or another suitable source of electrical energy. A conductor 33 connects one terminal of the instrument 29 with the spring 36 and/or pin 35 to establish an electrical connection with the lever 34.

When the camera is idle, i.e., when the shutter (not shown) is in the position of rest, the spring 36 maintains the lever 34 in the position shown in FIG. 4 whereby the variable resistor 28, 38 offers maximum resistance to the flow of electric current. The variable resistor reduces the strength of the current to a value which equals the average value of current strength when the shutter is driven at normal speed. If the motor which drives the shutter is started, i.e., if the shutter is accelerated from zero speed (position of rest) to normal operating speed, the portion 37 of the centrifugal governor moves axially from the position of FIG. 4 to that shown in FIG. 5, whereby the lever 34 turns in a counterclockwise direction and the spring 36 stores energy. The slider 38 travels along the stationary portion 28 of the variable resistor and engages the conductor 30 when the shutter reaches the normal operating speed. The influence of the resistor 28, 38 is then reduced to zero. The centrifugal governor insures that the variable resistor is disconnected gradually, i.e., as a function of the increase in speed of the shutter. This insures that the strength and voltage of current in the circuit including the moving coil instrument 29 will not change due to acceleration of the shutter but solely in the event that the intensity of scene brightness changes. Otherwise stated, the needle 29a of the instrument 29 will remain at a standstill during acceleration of the shutter unless, of course, the intensity of scene light changes during such acceleration.

In the embodiment of FIGS. 4 and 5, the overriding unit includes the centrifugal governor, the spring 36, the lever 34 and the variable resistor 28, 38.

Figure 6:
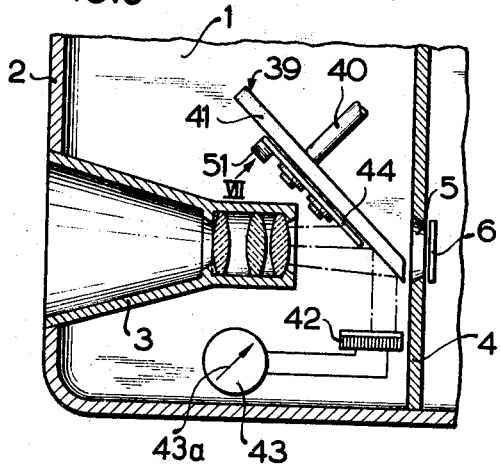
FIG. 6 is a fragmentary longitudinal vertical sectional view of a third movie camera.
Figure 8:
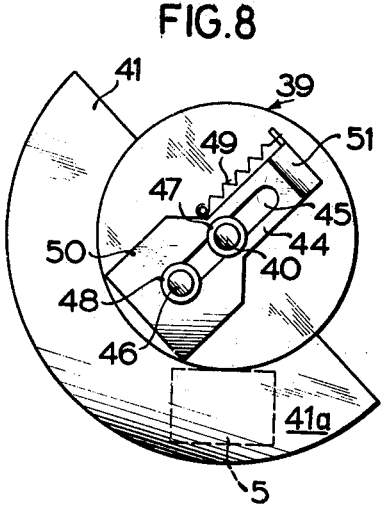
FIG. 8 illustrates the structure of FIG. 7 but showing the overriding means in the other end position.
Figure 7:
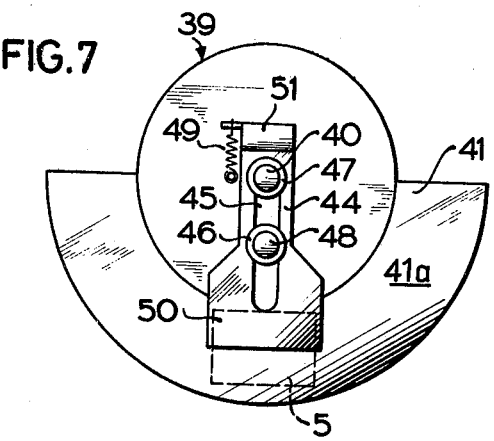
FIG. 7 is an enlarged front elevational view of the shutter substantially as seen in the direction of arrow VII in FIG. 6, the overriding means being illustrated in one end position corresponding to the rest position of the shutter.

Referring finally to FIGS. 6 to 8, there is shown a portion of a third movie camera which constitutes a modification of the camera shown in FIGS. 1 to 3. The housing 1 accommodates an objective 3 mounted on the front wall 2 and this housing has a partition 4 which defines a window 5 located in front of the movie film 6. The photosensitive element is shown at 42 and the moving coil instrument at 43. The shutter 39 resembles a portion of a flat disk and is rotated by a drive including a shaft 40. The blade 41 of the shutter 39 has a mirrored surface 41a which deflects light against the photosensitive element 42 when the shutter covers the window 5 and that frame of the film 6 which is located directly behind the window. The diaphragm which is adjusted as a function of the position of the output member 43a in the moving coil instrument 43 is not shown.

The shutter 39 is located behind a radially movable carrier 44 having an elongated slot 45 which receives a portion of the drive shaft 40. A driving pin 46 extends through the slot 45 at a point which is radially spaced from the shaft 40. This pin 46 is affixed to the shutter 39 so that it shares the latter's rotary movements and can drive the carrier 44. Washers 47, 48 are interposed between the heads of the shaft 40 and pin 46 on the one hand and the carrier 44 on the other hand. The carrier 44 comprises an opaque portion or mask 50 which partly overlies the mirrored surface 41a when the rotational speed of the shutter 39 is zero or is less than a predetermined minimum speed. The mask 50 is biased to such position by a spring 49 which operates between the carrier 44 and a post on the shutter 39. A mass or weight 51 at that end of the carrier 44 which is remote from the mask 50 shifts the carrier against the opposition of the spring 49 when the shutter 39 rotates at a speed which is higher than the aforementioned predetermined speed. The arrangement is such that the weight 51 maintains the mask 50 in the fully retracted position of FIG. 8 when the shutter 39 rotates at normal speed and that the spring 49 maintains the mask 50 in the position of FIG. 7 when the shutter is in the position of rest. The mask 50 then overlies about one-half of that part of the surface 41a which is in line with the objective 3. The shaft 40 acts not unlike a stop and opposes further contraction of the spring 49. This spring stores energy while the shutter 39 is being accelerated from zero speed to normal speed and remains under tension as long as the motor which drives the shutter remains on. The mask 50 is black and is matted to absorb light which is being deflected by the reflecting surface 41a of the blade 41 when the blade does cover the window 5. When the shutter 39 rotates at normal speed, the function of the stop is taken over by the pin 46 which then prevents further radial movement of the weight 51 away from the shaft 40. Light reflected by the surface 41a on the blade 41 is directed against the photosensitive element 42 which is connected in circuit with the moving coil instrument 43. The latter controls an adjustable diaphragm which is not shown in FIGS. 6 to 8. In the embodiment of FIGS. 6–8, the overriding unit includes the carrier 44 with mask 50, the spring 49 and the weight 51.

The mask 50 can reduce the amount of light that reaches the photosensitive element 42 to such an extent that this amount equals the average amount of light reaching the element 42 when the shutter 39 rotates at normal speed. Withdrawal of the mask 50 from the position of FIG. 7 to that of FIG. 8 is gradual and is carried out as a function of increasing speed of the shutter 39 during acceleration from zero speed to normal operating speed.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a motion picture camera, a combination comprising an adjustable diaphragm providing a range of aperture sizes; an objective; a shutter arranged to move cyclically between said objective and the film to cover and uncover the film during each cycle and having a position of rest in which the film is covered; drive means operative to accelerate the shutter from said position of rest to a normal speed; photosensitive means; light-reflecting means associated with said shutter to direct against said photosensitive means light passing through said objective when said shutter covers the film; motion transmitting means for adjusting said diaphragm as a function of the intensity of light reaching said photosensitive means; and overriding means for controlling the adjustment of said diaphragm as a function of the speed of said shutter during acceleration to said normal speed to compensate for changes in intensity of light reaching said photosensitive means at unchanging scene brightness during said acceleration of the shutter, said overriding means comprising a centrifugal governor having a portion receiving motion from said drive means.

2. A combination as defined in claim 1, wherein said drive means comprises a shaft connected with said shutter, said portion of said governor being rigid with said shaft and said governor comprising a second portion which moves axially of said shaft in response to increasing speed of said shaft.

3. A combination as defined in claim 1, wherein said portion of said governor includes a rotary part and said drive means comprises a rotary element connected with said shutter and said rotary part.

4. A combination as defined in claim 1, wherein said portion of said governor comprises a rotary carrier having an opaque portion extending between said light-reflecting means and said photosensitive means when said shutter is in said position of rest, said opaque portion moving at least partially out of the path of light directed by said light-reflecting means when said shutter operates at said normal speed.

5. A combination as defined in claim 4, wherein said drive means comprises a rotary shaft and said carrier is rotatable with and movable radially of said shaft, said opaque portion being provided on said carrier at one side of said shaft and said overriding means further comprising a weight provided on said carrier at the other side of said shaft and resilient means for opposing radial movement of said carrier under the action of said weight when said shaft rotates.

6. In a motion picture camera, a combination comprising an adjustable diaphragm providing a range of aperture sizes; an objective; a shutter arranged to move cyclically between said objective and the film to cover and uncover the film during each cycle and having a position of rest in which the film is covered; drive means operative to accelerate the shutter from said position of rest to a normal speed, said drive means comprising a shaft connected with said shutter; photosensitive means; light-reflecting means associated with said shutter to direct against said photosensitive means light passing through said objective when the shutter covers the film; motion transmitting means for adjusting said diaphragm as a function of the speed of said shutter during acceleration to said normal speed to compensate for changes in intensity of light reaching said photosensitive means at unchanging scene brightness during acceleration of the shutter; and overriding means for controlling the adjustment of said diaphragm means as a function of the speed of said shutter during acceleration to said normal speed to compensate for changes in intensity of light reaching said photosensitive means at unchanging scene brightness during acceleration of the shutter; said overriding means comprising a centrifugal governor having a first portion rigid with said shaft, a second portion which moves axially of said shaft in response to increasing speed of said shaft, and at least one weight movable radially outwardly between said first and second portions in response to increasing speed of said shaft, said portions having surfaces flanking said weight and arranged to move said second portion axially in response to radial movement of said weight.

7. A combination as defined in claim 6, wherein said overriding means further comprises a spring-biased member bearing against said second portion and arranged to influence said motion transmitting means in response to radial movement of said weight.

8. A combination as defined in claim 7, wherein said member comprises an opaque portion which overlies a portion of said photoensitive means to reduce the amount of light reaching said photosensitive means when said shutter is in the position of rest, and which is moved at least partially out of the path of light directed by light-reflecting means when the shutter moves at said normal speed.

9. A combination as defined in claim 7, wherein said overriding means comprises a variable resistor in series with said photosensitive means and said spring-biased member constitutes the movable portion of said resistor and is arranged to reduce the resistance of said variable resistor during acceleration of said shutter to normal speed.

References Cited

UNITED STATES PATENTS

| | | | |
|---|---|---|---|
| 3,248,166 | 4/1966 | Reinsch | 352—141 |
| 3,275,399 | 9/1966 | Johnson | 352—141 |

FOREIGN PATENTS

| | | |
|---|---|---|
| 791,685 | 9/1935 | France. |

NORTON ANSHER, Primary Examiner

JOSEPH F. PETERS, Jr., Assistant Examiner

U.S. Cl. X.R.

352—209